United States Patent [19]

Keiserman

[11] Patent Number: 5,135,248
[45] Date of Patent: Aug. 4, 1992

[54] SYSTEM FOR LIMITING RELATIVE ANGULAR MOVEMENT BETWEEN THE TRACTOR AND SEMI-TRAILER

[76] Inventor: Juarez Keiserman, Rue Coronel Bordini, 1273 Apartamento 501, 90420 Porto Alegre/RS, Brazil

[21] Appl. No.: 584,447

[22] Filed: Sep. 14, 1990

Related U.S. Application Data

[63] Continuation of Ser. No. 293,709, Jan. 5, 1989, abandoned.

[30] Foreign Application Priority Data

Jan. 6, 1988 [BR] Brazil .................................. 8800156

[51] Int. Cl.⁵ .............................................. B62D 53/06
[52] U.S. Cl. .................................. 280/432; 280/441.1; 280/446.1; 280/455.1
[58] Field of Search ................ 280/428, 432, 437, 404, 280/446.1, 423.1, 441.1, 455.1; 180/139, 134; 303/7

[56] References Cited

U.S. PATENT DOCUMENTS

| | | | |
|---|---|---|---|
| 3,507,517 | 4/1970 | Eagle | 280/432 |
| 3,722,918 | 3/1973 | Connor | 280/432 |
| 3,837,678 | 9/1974 | Cicero | 280/432 |
| 3,895,827 | 7/1975 | Padrick | 280/432 |
| 3,963,265 | 6/1976 | Kornoelje et al. | 280/432 |
| 3,972,542 | 8/1976 | Dirks et al. | 280/432 |
| 4,067,592 | 1/1978 | Horton | 280/432 |
| 4,068,860 | 1/1978 | Meyers et al. | 280/432 |
| 4,934,727 | 6/1990 | Hawkins | 280/423.1 |

*Primary Examiner*—Charles A. Marmor
*Assistant Examiner*—Anne Marie Boehler
*Attorney, Agent, or Firm*—Darby & Darby

[57] ABSTRACT

A system and method for blocking a relative angular movement between a semi-trailer and a traction vehicle so as to limit the angular movement to a predetermined angle. A lock of a locking system in a guide plate is inserted in a central angle of a fifth wheel that supports the semi-trailer. The lock is electro-pneumatically actuated by an electric signal signifying brake actuation. This prevents an involuntary angular movement between the semi-trailer and the tractor from taking place mainly upon actuation of the brakes because of an imbalance occurring between friction forces acting on the tires.

10 Claims, 3 Drawing Sheets

SYSTEM FOR LIMITING RELATIVE ANGULAR MOVEMENT BETWEEN THE TRACTOR AND SEMI-TRAILER

This is a continuation of application Ser. No. 293,709, filed Jan. 5, 1989, now abandoned.

BACKGROUND OF THE INVENTION

The present invention relates to a system for blocking the relative angular movement between a traction vehicle and the semi-trailer coupled thereto by means of a device attached to the semi-trailer, that acts on the fifth wheels of the tractor or traction vehicle.

Preventing the involuntary generation of excessive angles between traction vehicles and semi-trailers is important in order to avoid accidents, mainly during braking on slippery pavement. The excessive angles are generally caused by the uneven distribution of tire friction forces on the ground, and such excessive angles can impair the driver's control over the vehicle.

SUMMARY OF THE INVENTION

The present invention is directed at a system comprised of a lock that slides through a guide plate attached to the semi-trailer kingpin plate. The device, which is electro-pneumatically driven whenever the vehicle brakes are actuated, blocks the movement and controls the relative angle between the traction vehicle and the semi-trailer.

The lock is moved from a non-locking position to a locking position at which a relative movement between the traction vehicle and the semi-trailer is blocked. In this manner, an involuntary creation of an excessive angle between the traction vehicle and the semi-trailer is avoided that would otherwise be present mainly due to an uneven distribution of tire friction forces during braking over slippery pavement. The lock can return to its non-locking position by the biasing action of springs. The lock is actuated by an actuating member that is driven by a diaphragm.

The diaphragm elastically deforms as it is driven by compressed air to move the actuating member. This movement causes the lock to rotate about a shaft to the locking position. Hence, the lock is inserted within the central angle of the fifth wheel. When the compressed air is removed and the diaphragm elastically returns to its previous unexpanded condition, the lock biases back to its non-locking position by action of the springs.

The locking system may be attached by either bolts or welding to the semi-trailer and be free of any adaptation to the traction vehicle. Preferably, the guide plate is attached to the kingpin plate which supports the semi-trailer. This enables the locking system to be adapted for use by any type of semi-trailer, independent of its make, model, or the number of shafts present.

The lock is arranged so that the fifth wheel blocks the lock against further movement when a relative angle between the semi-trailer and the traction vehicle exceeds a predetermined angle in response to the locking system being activated. This allows for the free realignment of the semi-trailer and traction vehicle.

The system may be employed in any kind of traction vehicle and semi-trailer, independent of manufacturer, model or number of shafts, it sufficing that the coupling therebetween be made through the fifth wheel and the kingpin, according to the ISO (International Standards Organization) standard. The system is therefore quite versatile.

For a better understanding of the present invention, reference is made to the following description and accompanying drawings, while the scope of the invention is set forth in the appended claims:

BRIEF DESCRIPTION OF THE DRAWINGS

In the various figures of the appended drawings, the same reference numbers represent similar parts of the blocking system in question.

DETAILED DESCRIPTION OF THE PREFERRED EMBODIMENT

Figure 1:
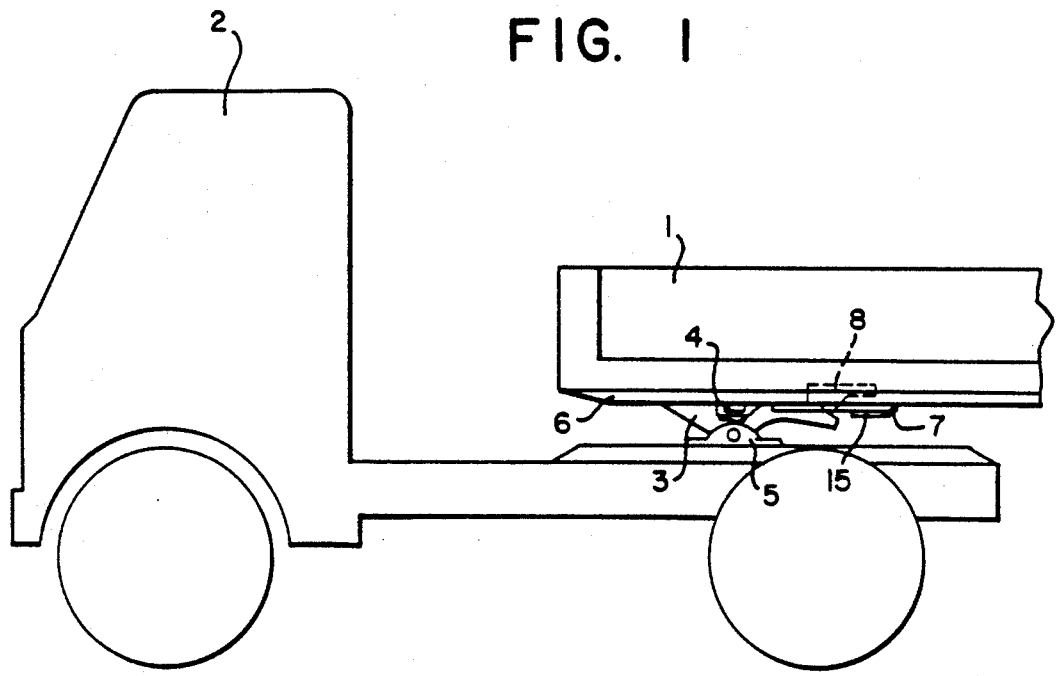
FIG. 1 is a schematic lateral plan view of a traction vehicle coupled to a semi-trailer, wherein one can observe the positioning of the blocking system.

As can be seen in FIG. 1, semi-trailer 1 is coupled to a traction vehicle 2 through the fifth wheel 3 and the kingpin 4. The semi-trailer is supported on the fifth wheel 3 by means of a sliding plate 6 hereinafter referred to as kingpin plate 6, the fifth wheel being attached to the traction vehicle by means of its base 5.

Figure 2:
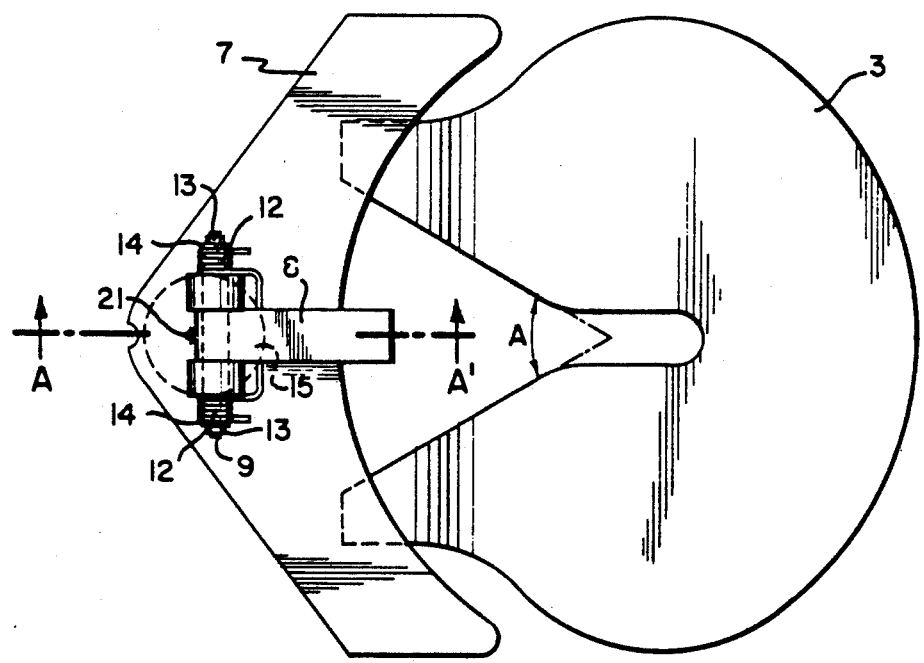
FIG. 2 is a schematic upper plan view of the blocking system, showing its position with respect to the fifth wheel.

FIG. 2 shows the blocking system, which is attached to the kingpin plate 6 by means of the guide-plate 7 and to the semi-trailer 1.

The electro-pneumatically actuated lock 8 slides through a groove in the guide-plate 7 and is inserted in the central angle $\hat{A}$ of the fifth wheel 3.

Figure 3:
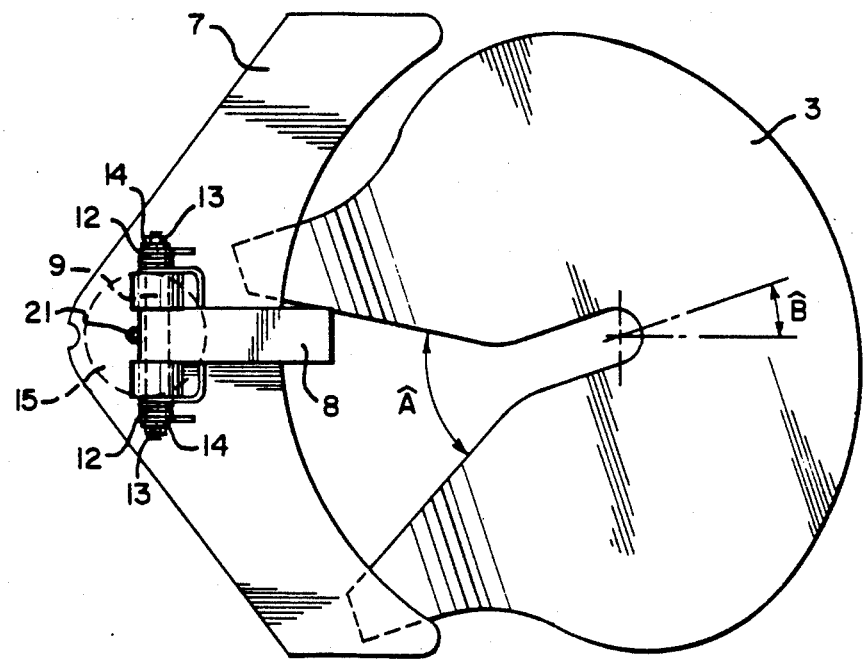
FIG. 3 is a schematic upper view of the fifth wheel and the blocking system in the movement limiting position with the system actuated.

As schematically shown in FIG. 3, should a relative angular movement between the semi-trailer 1 and traction vehicle 2 occur, it is blocked when one of the central angle, $\hat{A}$ faces of the fifth wheel 3 reaches the lock 8. This limits the movement of the fifth wheel to within a blocking area defined by a predetermined angle, hereinafter referred to as blocking angle $\hat{B}$.

Figure 4:
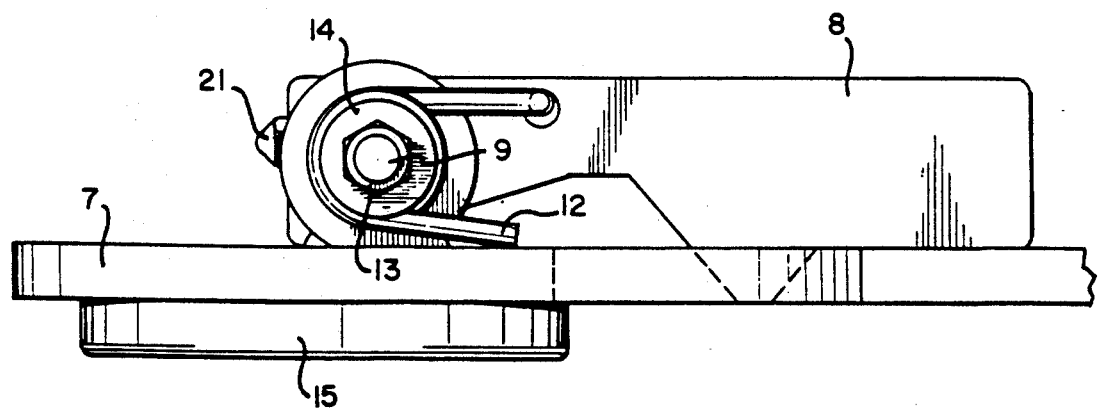
FIG. 4 is a lateral plan view of the locking system.
Figure 5:
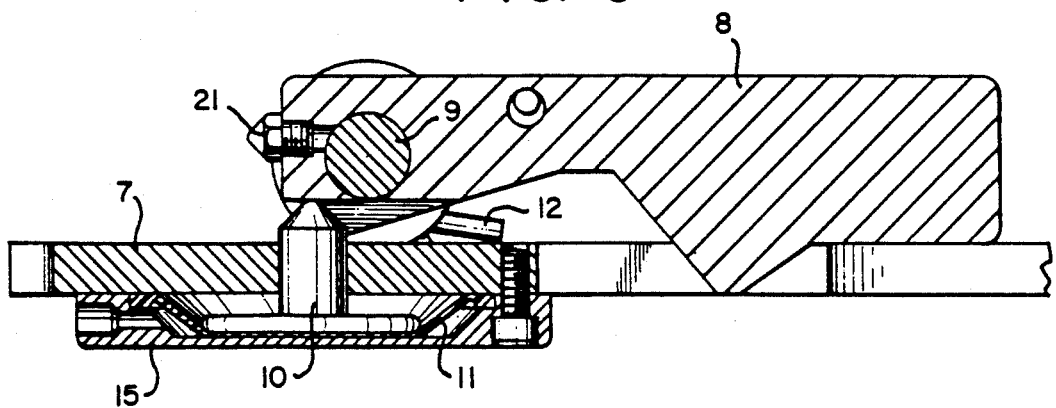
FIG. 5 is a cross-sectional view taken across section lines A—A' of the locking system showing the lock actuation and return system in the neutral position.
Figure 6:
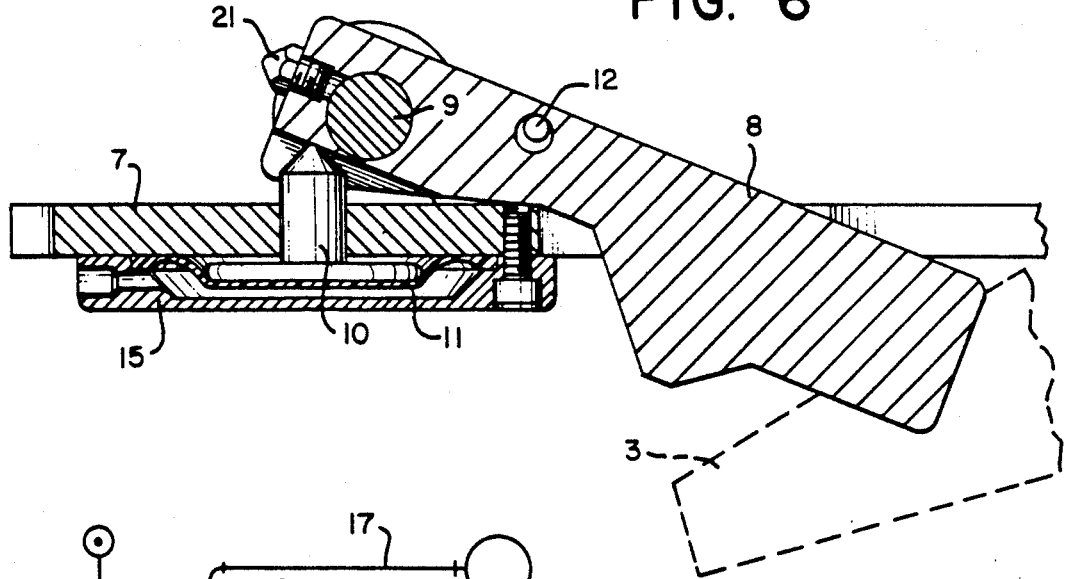
FIG. 6 is a cross-sectional view taken across section lines A—A' of the locking system of FIG. 2, showing the lock actuation and return system in the actuated position.

FIGS. 4, 5 and 6 illustrate the locking system of the blocking system, which includes the lock 8. The lock 8 can rotate around the shaft 9 attached to the guide plate 7 by means of a bearing. A diaphragm 11, driven by compressed air, urges an actuator 10 to impel and then move the lock 8. During this movement, the lock 8 is guided by a slot in the guide plate 7. Springs 12 surround the shaft 9 and are attached thereto by nuts 13 and washers 14. The springs 12 bias the lock 8 to return to its position before the actuator 10 moved the lock 8.

The cover 15 attaches the diaphragm 11 to the guide plate by means of bolts, forming a pressure chamber. The pressurizing of that chamber is done through an orifice in the cover 15 to which is connected by a pipe interconnecting it to the vehicle braking.

The system can be lubricated from the grease box 21.

Figure 7:
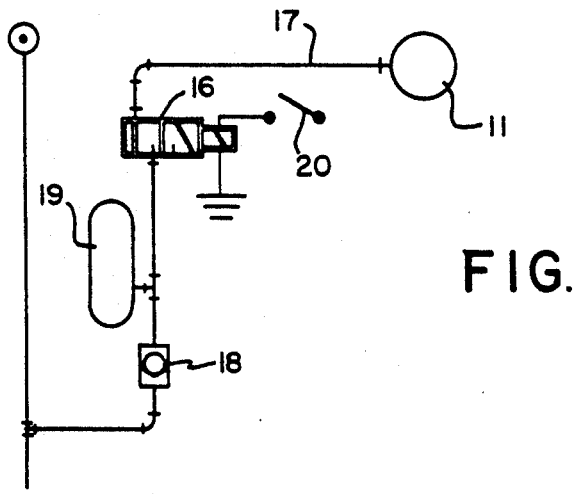
FIG. 7 is a schematic of the system's electro-pneumatic actuation system.

As schematically represented in FIG. 7, the compressed air from the semi-trailer 1 brake system, released by the solenoid valve 16, when energized, actuates the diaphragm 11 through piping 17. In order to ensure the system's operation even in the event of temporary absence of compressed air in the brake system, a check valve 18 and a compressed air reservoir 19 were included in the pneumatic circuit.

The system can be kept deactivated by means of the switch 20.

The solenoid valve 16 is energized through the same circuit to which is connected the semi-trailer 1 brake signalling; accordingly, whenever the latter is actuated, the same will happen to the system.

Therefore, as schematically shown in FIG. 3, when a relative angular movement occurs between the semi-trailer 1 and the traction vehicle 2 upon actuation of the brakes, that movement will be limited by the lock 8 inserted in the central angle Ā of the fifth wheel 3. This limited movement is effected by blocking the movement in the contact point of the fifth wheel 3 therewith.

When the braking system is deactivated, the compressed air is released by the solenoid valve 16, the lock 8 returning to the deactivated position, by means of springs 12.

The lock 8 is positioned in such a manner that, if the brakes are actuated in a position where the relative angle between the semi-trailer and the traction vehicle 2 is greater than the blocking angle, the fifth wheel 3 prevents it from acting. This prevents any possibility of blocking the realignment of the semi-trailer 1 and the traction vehicle 2.

Put another way, the lock 8 or locking element is arranged with respect to the fifth wheel 3 so that the fifth wheel blocks further movement of the lock 8 in the same direction whenever the relative angular orientation of the traction vehicle 2 and semi-tractor 1 is such that such further movement of the lock 8 would otherwise cause the lock 8 to be in a position which blocks relative movement between the traction vehicle and semi-tractor anywhere outside of the blocking area defined by the relative blocking angle.

The present invention can be constructed in various respects, without departing from the spirit and scope of the present invention.

The construction shown should be considered in all of its aspects, always taking into account its illustrative and non-restrictive nature. The claims that follow are intended to comprise all modifications that do not depart from the spirit of the present invention.

What is claimed is:

1. A system for limiting relative angular movement between a traction vehicle and a semi-trailer, comprising:
   a locking element;
   locking means responsive to actuation of a vehicle brake for moving the locking element in a direction from an unlocking position at which said locking element is free of a fifth wheel of the traction vehicle to a locking position at which said locking elements blocks a path of relative angular movement of the fifth wheel with respect to the semi-trailer and thereby limits the relative angular movement attainable by the fifth wheel to within that of a blocking area defined by a relative blocking angle, said locking means including means for pivoting said locking element about a shaft to move between said unlocking and locking positions;
   returning means responsive to cessation of actuation of the vehicle brake of the traction vehicle for returning said locking element from said locking position to said unlocked position; and
   means for freeing said locking means of any adaptation to the traction vehicle, said freeing means including means for keeping said locking means supported by the semi-trailer, said locking element being arranged to be blocked against further movement in the same direction by the fifth wheel whenever the relative angular orientation between the traction vehicle and the semi-trailer is such that said further movement of the locking element in the same direction would otherwise cause the locking element to be in a position for blocking relative movement between the traction vehicle and the semi-trailer anywhere outside of said blocking area, whereby free realignment of the traction vehicle and semi-trailer may take place even if the vehicle brakes are actuated.

2. A system as in claim 1, wherein said returning means includes means for biasing said lock to said unlocked position.

3. A system as in claim 1, wherein said driving means includes an actuating member and a diaphragm means for moving said actuating member in response to actuation of the vehicle brakes, said locking element moving in response to movement of said actuating member.

4. A system as in claim 1, further comprising:
   a guide plate;
   means for securing said shaft to said guide plate;
   means for attaching said guide plate to a king-pin plate of the semi-trailer, said guide plate having a slot for guiding said locking element to reach said locking position.

5. A system as in claim 3, further comprising:
   electro-pneumatic control means for driving said diaphragm means with compressed air to move said actuating member, said electro-pneumatic control means including a solenoid valve and means for energizing said solenoid valve in response to actuation of the vehicle brake so as to enable passage of the compressed air through said solenoid valve to reach said diaphragm means.

6. A method for limiting relative angular movement between a traction vehicle and a semi-trailer, comprising:
   (a) responding to actuation of a vehicle brake by moving a locking element in a direction from an unlocking position at which the locking element is free of a fifth wheel of the traction vehicle to a locking position at which the locking element blocks a path of relative angular movement of a fifth wheel with respect to the semi-trailer and thereby limits the relative angular movement attainable by the fifth wheel to within a blocking area defined by a relative blocking angle;
   (b) pivoting said locking element about a shaft to move between said unlocking and locking positions;
   (c) responding to cessation of actuation of the vehicle brake of the traction vehicle by returning said locking element from said locking position to said unlocked position; and
   (d) freeing said locking element of any adaptation to the traction vehicle by keeping the locking element supported by the semi-trailer; and enabling free alignment of the traction vehicle and semi-trailer to take place even if the vehicle brakes are applied, the step of enabling including blocking of the locking element with the fifth wheel against effecting further movement in the same direction whenever the relative angular orientation between the traction vehicle and the semi-trailer is such that the further movement of the locking element in the same direction would otherwise cause the locking element to be in a position for blocking relative movement between the traction vehicle and the semi-trailer anywhere outside of said blocking area.

7. A method as in claim 6, wherein the step (c) includes biasing the locking element into the unlocked position.

8. A method as in claim 6, wherein the step (b) moving an actuating member by a diaphragm in response to actuation of the vehicle brake, the locking element moving in response to movement of said actuating member.

9. A method as in claim 6, further comprising:
guiding the locking element in a slot of a guide plate to reach the locking position, the guide plate securing the shaft and being attached to a king-pin plate of the semi-trailer.

10. A method as in claim 6, further comprising the step of driving a diaphragm with compressed air to move an actuating member by energizing a solenoid valve in response to actuation of the vehicle brake so as to enable passage of the compressed air through said solenoid valve to reach said diaphragm means, the locking element moving in response to movement of the actuating member.

* * * * *